United States Patent [19]

Byrd

[11] Patent Number: 5,496,784
[45] Date of Patent: Mar. 5, 1996

[54] CHEMICAL RESISTANT COATING COMPOSITIONS

[75] Inventor: Norman R. Byrd, Villa Park, Calif.

[73] Assignee: McDonnell Douglas Corporation, Huntington Beach, Calif.

[21] Appl. No.: 604,208

[22] Filed: Oct. 29, 1990

[51] Int. Cl.[6] .............................. B01J 31/06; B32B 9/04
[52] U.S. Cl. ........................................... 502/152; 428/447
[58] Field of Search .................................. 428/447, 246, 428/252, 253, 282; 204/157.74; 427/452; 502/152; 528/15, 21, 31, 37; 556/11, 453, 456

[56] References Cited

U.S. PATENT DOCUMENTS

| | | | |
|---|---|---|---|
| 3,775,452 | 11/1973 | Karstedt | 260/429 R |
| 3,814,731 | 6/1974 | Nitzsche et al. | 260/46.5 |
| 3,992,427 | 11/1976 | Chandra et al. | 260/488.2 E |
| 4,077,943 | 3/1978 | Sato et al. | 260/46.5 UA |
| 4,382,983 | 5/1983 | Yuyama et al. | 428/447 |
| 4,600,484 | 7/1986 | Drahnak | 204/157.74 |
| 4,618,657 | 10/1986 | Katchko et al. | 428/447 |
| 4,654,270 | 3/1987 | Katchko et al. | 428/447 |
| 4,943,475 | 7/1990 | Baker et al. | 428/426 |

*Primary Examiner*—Donald P. Walsh
*Assistant Examiner*—John N. Greaves
*Attorney, Agent, or Firm*—Roger C. Turner; John P. Scholl

[57] ABSTRACT

A coating having resistance to chemical warfare agents, comprising a cured mixture of (a) a polysiloxane having unsaturated groups available for cross-linking, (b) a polysiloxane containing reactive Si-H groups and (c) an unsaturated compound such as ethyl acrylate to prevent formation of bubbles in the coating due to the liberation of hydrogen from such Si-H groups during curing, and to provide a smooth bubble-free coating. A platinum siloxane catalyst is also employed in the mixture. A representative coating composition is a mixture of compounds (a) polydimethylsiloxane, vinyl dimethylterminated; (b) polymethylhydrosiloxane, and (c) ethyl acrylate; and platinum-divinyltetramethyldisiloxane complex catalyst. The coating composition cures at room temperature and in a relatively short period of time.

20 Claims, No Drawings

CHEMICAL RESISTANT COATING COMPOSITIONS

BACKGROUND OF THE INVENTION

This invention relates to chemical resistant polymer coatings, and is particularly directed to the provision of chemical warfare agent resistant polysiloxane coatings on substrates such as structural metals, e.g. aluminum.

Survival of aircraft in a chemical warfare (CW) environment requires that the aircraft materials of construction be able to withstand the effects of either the CW agents and/or the subsequent decontamination procedures required to remove these agents. The problems created by these CW agents are: (1) corrosion of aircraft materials and structures; (2) swelling and degradation of seals, insulation, and transparencies; and (3) deterioration of avionic components and wiring. Additionally, current decontamination agents and procedures are equally severe and can also have a detrimental effect on aircraft structures and components. To change the aircraft materials of construction for protection against a specific agent also becomes impractical. Thus, a coating that can be applied to all areas of an aircraft which will exhibit minimal adsorption and/or absorption of the CW agent and from which the agents can be readily desorbed by washing with soap and water is a particular object of the invention.

Various procedures have been considered for minimizing the effect of CW agents on aircraft materials of construction. The basic process is to allow the contaminant to make contact with the aircraft and then resort to decontamination procedures. However, the decontamination process is quite severe with a serious adverse effect on the aircraft materials of construction.

Another method is to coat the surface with a water-soluble polymer into which the CW agent is absorbed. Subsequently, this coating is washed off with water and the substrate is protected. This process has the limitation of being applicable to surfaces that would not be affected by water, e.g., metal or composite. Sensitive avionic equipment might sustain damage from the water. Additionally, if the outer surface was so protected and the aircraft was flying through rain, or was being washed down, it would remove the coating. Thus, this becomes somewhat impractical.

Another method that has been considered is to coat the surface with parylene. This is a good surface, but impractical to apply on a large area. It would be effective for small parts because the method of application involves heating a monomer (para cyclophane) under vacuum and passing the resultant diradical that forms into a chamber at low temperatures, at which point the parylene polymer will form by condensing on a substrate. This is quite impractical for a large surface structure.

Hence, another object of the invention is to provide a liquid polymer that can be applied to any substrate and which will form a coating with a "low sticking coefficient." By definition, a "low sticking coefficient" coating is one on which little material would be adsorbed and relatively little would be absorbed after long exposure time. Additionally, it would also allow for a relatively rapid desorption, and from which the adsorbed agent can be removed by washing with soap and water. Teflon is a good example of a "low sticking coefficient" material, but teflon cannot be used since it is not possible to make a continuous film of teflon from solution. It can only be applied to substrates by sintering teflon powder at high temperature to make a contiguous coating. Commercial teflon film is not practical since it cannot be made to readily adhere to most substrates.

Polydimethyl siloxane (silicone rubber) has been used as coatings, but such coatings have not proven sufficiently resistant to CW agents or their simulants. Moreover, to cure a conventional siloxane of this type, it is necessary to treat with a peroxide at high temperature, posing problems for preparation of coatings, particularly for large area surfaces, and hence is not feasible.

Mixtures of various siloxane components for reaction to form a polymer are known. Thus, it is known to react unsaturated siloxanes with cross linking agents to produce siloxane polymers. However, application of such mixtures to a substrate for formation of a coating resistant to chemical warfare agents has not heretofore been achieved.

In U.S. application Ser. No. 07/604,877, pending, filed of even date herewith, by Norman R. Byrd, and assigned to the same assignee as the present application, there is disclosed a coating composition in the form of a liquid mixture of (a) a polysiloxane having unsaturated groups available for cross-linking, such as a vinyl group, and (b) a polysiloxane containing reactive Si-H groups. A small amount of a platinum siloxane catalyst is also present. Such liquid coating composition can be applied to a substrate at room temperature and cured at room temperature to form a coating resistant to CW agents or simulants. However, in some instances, the surfaces of the resulting coatings have bubbles due to liberation of hydrogen from the Si-H groups of component (b). Such bubbly coatings form a rough surface which may disadvantageously promote CW agent or simulant absorption.

Accordingly, still other objects of the invention are the provision of improved mixtures of modified siloxanes containing an additive, and which upon curing form smooth bubble-free coatings which show minimal adverse effects after exposure to CW agents or simulants, the application of such mixtures to a substrate such as aluminum, and the resulting cured improved coating systems which are resistant to CW agents or simulants thereof.

SUMMARY OF THE INVENTION

It has been found that the addition of an unsaturated compound capable of absorbing hydrogen, such as ethyl acrylate to the mixture of modified siloxanes of my above copending application, prevents possible formation of bubbles in the coating due to liberation of hydrogen from the polysiloxane containing the Si-H group during curing, and results in a smooth coating surface resistant to CW agents and simulants.

The coating composition of the present invention accordingly is in the form of a liquid mixture of (a) a polysiloxane having unsaturated groups available for cross-linking, such as a vinyl group, (b) a polysiloxane containing reactive Si-H groups, and (c) an unsaturated compound capable of absorbing hydrogen and effective to prevent bubbles from forming in the resulting cured coating. A small amount of a platinum siloxane catalyst is also present.

Such liquid coating composition, with or without a solvent, can be applied at room temperature to a substrate such as aluminum, and the resulting coating cured at room temperature in a short period of time, to an essentially smooth bubble-free coating.

DETAILED DESCRIPTION OF THE INVENTION AND PREFERRED EMBODIMENTS

The reactants involved in preparing the CW agent resistant coatings of the invention are (a) a polysiloxane having unsaturated groups available for cross-linking, (b) a polysiloxane containing reactive Si-H groups, and a platinum siloxane catalyst.

As examples of compound (a) above, polysiloxanes having various unsaturated functional groups can be employed. Such unsaturated groups include vinyl, acrylic and methacrylic groups. Specific examples of such compounds are as follows

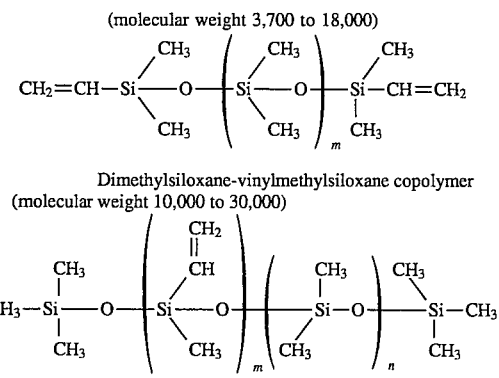

Dimethylsiloxane-vinylmethylsiloxane copolymer

An additional example is a trifluoro compound similar to compound II, but having a trifluoropropyl group in place of one of the methyl groups, and represented below.

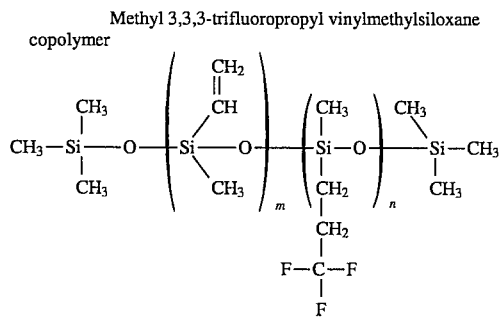

Generally, in the above polysiloxanes having an unsaturated group, the value n in compound I, and m+n in compounds II and IIa are such that such compounds can have an overall molecular weight ranging from about 500 to about 500,000.

Any of the compounds I, II and IIa above can be used separately or in combination. It has been found that compound II is preferred, and that a combination of compounds I and II is particularly effective.

Compound (b) above is a polysiloxane containing reactive Si-H groups or a hydrosiloxane, and functions as a cross-linking agent providing cross-linking sites for reaction with compound (a), the polysiloxane having unsaturated functional groups. Examples of compound (b) are as follows

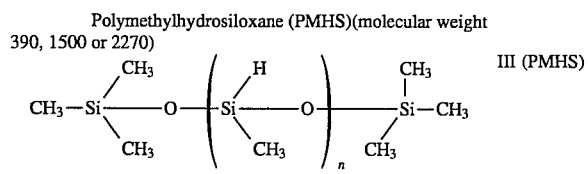

where n is 5 to 46.

1,1,3,3,-Tetramethyldisiloxane

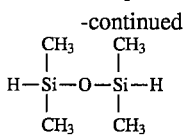

The above siloxanes containing an Si-H group can have a molecular weight ranging from about 134 to about 2300.

A suitable platinum catalyst, for the reaction between compounds (a) and (b) above is required. Various platinum siloxane catalysts can be employed, such as platinum-divinyltetramethyldisiloxane complex (V) in xylene solvent, and platinum cyclovinylmethyl siloxane complex, the preferred catalyst being the former. Each of the above catalysts is a chloroplatinic acid complex with a vinylsiloxane compound, and is denoted generally herein as a platinum siloxane catalyst.

Thus, for example, compound I, II or IIa, or a combination thereof, e.g. a combination of I and II can be used, together with compound III or IV, or with a combination of III and IV, and catalyst V..

The proportions of compounds (a) and (b) employed for reaction can vary widely, depending on the desired properties of the final coating. Thus, the mixture of compounds (a) and (b) can be employed in a range of proportions from about 1 to about 99% of compound (a), or a combination thereof, and about 99 to about 1% of compound (b), or a combination thereof, by weight of the mixture of compounds (a) and (b). For optimal properties of the coating, that is, a highly adhesive durable coating having high resistance to chemical warfare agents, the preferred range of proportions is about 20 to about 80% of compound (a), or a combination thereof, and about 80 to about 20% of compound (b), or a combination thereof, by weight of the mixture of compounds (a) and (b).

Only a small amount of catalyst is required, e.g. ranging from about 0.04 to about 0.8%, by weight of the overall mixture of compounds (a) and (b).

As an important feature of the present invention, it has now been found that the addition of an active unsaturated compound capable of absorbing hydrogen, compound (c), and functioning as hydrogen acceptor, to the coating composition hereof, prevents bubbles from forming in the coating, due to the liberation of hydrogen from the Si-H groups of component (b), the hydrosiloxane, generated from the curing reaction of the polysiloxane, compound (a), with the hydrosiloxane, and results in a uniformly smooth cured coating. Examples of suitable unsaturated compounds for this purpose are ethyl acrylate, styrene, quinhydrone, acrylonitrile and vinyl benzyl chloride, and mixtures thereof. However, any unsaturated compound effective to absorb hydrogen liberated from the Si-H groups of compound (b) in the above curing reaction and to prevent bubbles from forming in the coating, can be employed. Such unsaturated compound can be employed in an amount of about 0.5 to about 30% by weight of the overall mixture of components (a), the polysiloxane having unsaturated groups, and (b) the polysiloxane containing reactive Si-H groups. Such unsaturated compound is soluble in the liquid coating composition. The presence of the above unsaturated compound in the coating composition does not otherwise change the characteristics of the siloxane composition, namely its ability to cure to a tough durable CW agent resistant coating in a relatively short time and at room temperature, as noted above.

The substrates to which the coating composition or mixture of compounds (a), (b) and (c) and catalyst is applied can vary widely and can include metals, e.g. aluminum, titanium and steel, plastics, composites, e.g. fiberglass reinforced epoxy, fibers and fabrics, such as fiberglass, and the like.

The coating composition or mixture can employ a solvent medium such as tetrahydrofuran (THF) or methylene chloride, or can employ a neat system, that is, no solvent at all, wherein the liquid reactants are simply mixed together to form a liquid coating composition, and the unsaturated compound dissolved therein. A solvent is generally used where any problem of solubility of one or more of the reaction components is presented.

The curing or polymerization reaction of the coating composition of compounds (a), (b) and (c) and the platinum catalyst, takes place at room temperature. Thus, the coating composition can be formulated at room temperature and applied to the substrate, and the coating cures at room temperature in a matter of minutes, e.g. about 2 to about 60 minutes. Any conventional coating method can be employed for applying the ocating composition to the substrate, e.g. by pouring, brushing, or doctor blade.

The following are examples of practice of the invention for obtaining CW agent resistant coatings. In each case, the components were mixed in the amounts set forth, and the resulting liquid composition applied to an aluminum substrate and cured at room temperature.

EXAMPLE 1

5.97 grams II (M.W. 30,000)
2.0 grams III (PMHS, M.W. 390)
2.0 grams Ethyl acrylate
0.0172 gram V A smooth bubble-free coating was obtained after curing.

EXAMPLE 2

5.97 grams I (M.W. 5970)
2.0 grams III (PMHS, M.W. 390)
2.0 grams Ethyl acrylate
0. 0172 gram V This coating was a soft, slightly gummy, bubble-free coating. This was believed due to steric hinderance from the terminal methyl groups of compound I. To overcome this problem, it was found that a mixture of I and II resulted in a better Coating. This mixture was employed in the following example.

EXAMPLE 3

3.0 grams II
5.97 grams I
1.0 gram Ethyl acrylate
4.0 grams III (PMHS M.W. 390)
0.0172 gram V The coating formed was a firm, bubble-free, rubbery coating.

EXAMPLE 4

5.97 grams II
2.0 grams III (PMHS, M.W. 390)
2.0 grams Styrene
0. 0466 gram V

EXAMPLE 5

5.97 grams I
3.0 grams II
0.4 gram III (PMHS, M.W. 390)
1.0 gram Styrene
0.0466 gram V

EXAMPLE 6

5.97 grams I
3.0 grams II
0.5 gram Quinhydrone (dissolved in 28 mls THF)
0.4 gram III (PMHS, M.W. 390)
0.0466 gram V

EXAMPLE 7

5.97 grams II
2.0 grams III (PMHS, M.W. 390)
0.5 gram Quinhydrone in 28 mls THF
0.0466 gram V

EXAMPLE 8

In the composition of Example 1, in place of ethyl acrylate, an equal amount of acrylonitrile is employed.

The resulting coating is similar to the coating in Example 1.

In each of Examples 1 to 8 a firm, smooth bubble-free rubbery coating was formed after curing.

When the coatings of Examples 1 to 8 were formed on the aluminum substrate, and a few drops of each of the CW simulants (DMMP), bis-beta chloroethyl ether (BCEE) and malathion (MAL), put upon them, and the simulants were washed off with water and methyl alcohol after three days exposure, the coatings were found to exhibit little or no absorption. It is noted that the above simulants DMMP, BCEE and MAL are similar to live CW agents known as (SARIN) (GB), Mustard (HD) and (VX), respectively. On the average, the coatings had either a zero change in weight or about a+/− 0.05 percent change, depending upon the simulant. This shows that there is substantially no reaction between the CW simulant and the coating and that the CW simulant does not remain on the surface of the coating. For optimum results such weight should be negligible.

By comparison, the polysiloxane (standard silicone) rubber coating, treated with the above simulants in the same manner as noted above, gave values for weight change ranging from about −7 percent for the BCEE to +10 percent for DMMP and +26 percent for MAL, over the same period of time.

Additionally, the contact angle of the drops of the DMMP simulant with the surface of the coatings was between low and medium, e.g. between about 45° and 75°, respectively. Such contact angle is a measure of the degree of wettability of the drops of CW simulant with the surface of the coating, the greater the angle of contact, the greater the wettability of the drops with the coating. The object is to reduce wettability as much as possible and thus decrease adherence of the CW agent or simulant to the coating surface. Thus, the coatings of the invention showed relatively little interaction and effect due to the presence of the DMMP simulant.

The coatings of the invention can also find application as protective coatings on all surfaces exposed to dirt and grime, such as aircraft interiors.

From the foregoing, it is seen that the invention provides improved tough, durable, smooth uniform surface coatings which can be permanently bonded to structural substrates, such coatings being substantially bubble-free and resistant to various contaminants such as chemical warfare agents, as evidenced by resistance to simulants thereof, and/or resistant to dirt and grime. Particular advantages reside in the simplicity and ease of forming the coatings, and the process for forming the coatings is energy conserving since no heat is required for curing the coating.

Since various changes and modifications of the invention will occur to those skilled in the art within the spirit of the invention, the invention is not to be taken as limited except by the scope of the appended claims.

What is claimed is:

1. A coating on a substrate, said coating having resistance to chemical warfare agents, said coating comprising a cured mixture of compounds (a) a combination of dimethylsiloxane-vinylmethylsiloxane copolymer and methyl 3,3,3-trifluoropropylvinylmethylsiloxane copolymer, (b) a polysiloxane containing reactive Si-H groups, and (c) an unsaturated compound effective to absorb hydrogen liberated from said Si-H groups during the curing reaction, and to prevent bubbles from forming in said coating.

2. A coating on a substrate as defined in claim 1, wherein compound (a) is a polysiloxane containing vinyl, acrylic or methacrylic groups.

3. The coating on a substrate as defined in claim 1, wherein compound (a) is a polysiloxane selected from the group consisting of vinyldimethyl terminated polydimethyl siloxane dimethylsiloxane-vinylmethylsiloxane copolymer, methyl 3,3,3-trifluoropropyl-vinylmethylsiloxane copolymer, and combinations thereof.

4. The coating on a substrate as defined in claim 3, wherein said compound (a) has a molecular weight ranging from about 500 to about 500,000.

5. The coating on a substrate as defined in claim 3, wherein compound (b) is a polysiloxane selected from the group consisting of polymethylhydrosiloxane and 1,1,3,3-tetramethyldisiloxane, and combinations thereof.

6. The coating on a substrate as defined in claim 1, said unsaturated compound selected from the group consisting of ethyl acrylate, acrylonitrile, styrene, quinhydrone and vinyl benzyl chloride, and mixtures thereof.

7. The coating on a substrate as defined in claim 1, said mixture containing about 1 to about 99% of compound (a), and about 99 to about 1% of compound (b), by weight of said mixture, and about 0.5 to about 30% of said unsaturated compound by weight of the mixture of compounds (a) and (b).

8. The coating on a substrate as defined in claim 1, wherein compound (a) is a polysiloxane selected from the group consisting of vinyldimethyl terminated polydimethyl siloxane dimethylsiloxane-vinylmethylsiloxane copolymer, methyl 3,3,3-trifluoropropyl-vinylmethylsiloxane copolymer, and combinations thereof, said compound (b) is a polysiloxane selected from the group consisting of polymethylhydrosiloxane and 1,1,3,3-tetramethyldisiloxane, and combinations thereof, said mixture containing about 1 to about 99% of compound (a), and combinations thereof, and about 99 to about 1% of compound (b), and combinations thereof, by weight of the mixture of compounds (a) and (b).

9. The coating on a substrate as defined in claim 8, said mixture containing about 0.5 to about 30% of said unsaturated compound by weight of the overall mixture of compounds (a) and (b).

10. The coating on a substrate as defined in claim 9, said unsaturated compound being selected from the group consisting of ethyl acrylate, acrylonitrile, styrene, quinhydrone, and vinyl benzyl chloride, and mixtures thereof.

11. A composition capable of being cured to form a smooth coating having resistance to chemical warfare agents, comprising a cured mixture of compounds (a) a combination of dimethylsiloxane-vinylmethylsiloxane copolymer and methyl 3,3,3-trifluoropropyl-vinylmethylsiloxane copolymer, (b) a polysiloxane containing reactive Si-H groups, and (c) an unsaturated compound effective to absorb hydrogen liberated from said Si-H groups during the curing reaction, and to prevent bubbles from forming in said coating, and including a suitable platinum catalyst for the reaction between compounds (a) and (b).

12. The composition as defined in claim 11, wherein compound (a) is a polysiloxane containing vinyl, acrylic or methacrylic groups.

13. The composition as defined in claim 11, wherein compound (a) is a polysiloxane selected from the group consisting of vinyldimethyl terminated polydimethyl siloxane dimethylsiloxane-vinylmethylsiloxane copolymer, and methyl 3,3,3-trifluropropyl-vinylmethylsiloxane copolymer, and combinations thereof.

14. The composition as defined in claim 13, wherein compound (b) is a polysiloxane selected from the group consisting of polymethylhydrosiloxane and 1,1,3,3-tetramethyldisiloxane, and combinations thereof, and said platinum catalyst is platinum-divinyl-tetramethyldisiloxane complex.

15. The composition as defined in claim 14, wherein compound (a) is a combination of vinyldimethyl terminated polydimethyl siloxane and dimethylsiloxane-vinylmethylsiloxane copolymer.

16. The composition as defined in claim 11, said unsaturated compound selected from the group consisting of ethyl acrylate, acrylonitrile, styrene, quinhydrone and vinyl benzyl chloride, and mixtures thereof.

17. The composition as defined in claim 16, said mixture containing about 1 to about 99% of compound (a) and about 99 to about 1% of compound (b), by weight of the mixture of compounds (a) and (b), and about 0.5 to about 30% of said unsaturated compound by weight of the overall mixture of compounds (a) and (b).

18. The composition as defined in claim 11, wherein compound (a) is a polysiloxane selected from the group consisting of vinyldimethyl terminated polydimethyl siloxane and dimethylsiloxane-vinylmethylsiloxane copolymer, methyl 3,3,3-trifluropropyl-vinylmethylsiloxane copolymer and combinations thereof, said compound (b) is a polysiloxane selected from the group consisting of polymethylhydrosiloxane and 1,1,3,3-tetramethyldisiloxane, and combinations thereof, said mixture containing about 1 to about 99% of compound (a) and about 99 to about 1% of compound (b), by weight of the mixture of compounds (a) and (b).

19. The composition as defined in claim 18, said mixture containing about 0.5 to about 30% of said unsaturated compound by weight of the overall mixture of compounds (a) and (b).

20. The composition as defined in claim 19, said unsaturated compound selected from the group consisting of ethyl acrylate, acrylonitrile, styrene, quinhydrone and vinyl benzyl chloride, and mixtures thereof.

* * * * *